(12) United States Patent
Lim et al.

(10) Patent No.: US 7,417,823 B2
(45) Date of Patent: Aug. 26, 2008

(54) DATA STORAGE DEVICE WITH SHOCK SENSOR MOUNTED ON CIRCUIT BOARD AND PROVIDED ADJACENT SHIELD AND DISC ASSEMBLY PROTRUSIONS

(75) Inventors: BengSee Lim, Singapore (SG); WaiOnn Chee, Singapore (SG); PeiKoh Lee, Singapore (SG); Jimmy TzeMing Pang, Singapore (SG); BoonSeng Ong, Singapore (SG); Niroot Jierapipatanakul, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 428 days.

(21) Appl. No.: 11/073,952

(22) Filed: Mar. 7, 2005

(65) Prior Publication Data
US 2006/0198045 A1 Sep. 7, 2006

(51) Int. Cl.
G11B 33/10 (2006.01)
G11B 33/12 (2006.01)
G11B 25/04 (2006.01)
(52) U.S. Cl. .................................... 360/97.01
(58) Field of Classification Search ............... 360/97.01, 360/97.02, 97.03, 98.01
See application file for complete search history.

(56) References Cited

U.S. PATENT DOCUMENTS

| | | | | |
|---|---|---|---|---|
| 5,235,472 A | | 8/1993 | Smith | |
| 5,243,495 A | * | 9/1993 | Read et al. | 360/97.01 |
| 5,420,733 A | | 5/1995 | Knighton et al. | |
| 5,502,604 A | * | 3/1996 | Furay | 360/97.01 |
| 5,721,457 A | * | 2/1998 | Sri-Jayantha et al. | 720/692 |
| 5,757,580 A | | 5/1998 | Andress et al. | |
| 6,078,498 A | * | 6/2000 | Eckerd et al. | 360/97.02 |
| 6,288,866 B1 | * | 9/2001 | Butler et al. | 360/97.01 |
| 6,320,723 B1 | * | 11/2001 | Bernett | 360/97.02 |
| 6,324,054 B1 | * | 11/2001 | Chee et al. | 360/97.01 |
| 6,417,979 B1 | | 7/2002 | Patton, III et al. | |
| 6,597,532 B1 | | 7/2003 | Usui et al. | |
| 6,629,359 B2 | | 10/2003 | Choi | |
| 6,674,608 B1 | * | 1/2004 | Bernett | 360/97.01 |
| 6,697,217 B1 | * | 2/2004 | Codilian | 360/97.01 |
| 6,958,884 B1 | * | 10/2005 | Ojeda et al. | 360/97.02 |
| 2002/0057522 A1 | * | 5/2002 | Bernett et al. | 360/97.01 |
| 2003/0103287 A1 | | 6/2003 | Agematsu | |

* cited by examiner

*Primary Examiner*—Craig A Renner
(74) *Attorney, Agent, or Firm*—Shumaker & Sieffert, P.A.

(57) ABSTRACT

An apparatus and method for mounting a shock sensor to the printed circuit board (PCB) of a disc drive are provided. In particular, the present invention allows the shock sensor to be mounted at any location on the printed circuit board rather than being limited to placement adjacent a mounting screw. The present invention includes a clamping mechanism for rigidly clamping the PCB to the head disc assembly (HDA) so that any shock is properly transmitted from the HDA to the PCB and then to the shock sensor. In one exemplary embodiment, the PCB is clamped between a shield and the HDA. The shock sensor is then position near the point at which the PCB is clamped so that the point of clamping provides transmission of any shock in the Z-axis to the shock sensor. Shocks in the X-Y axis direction are transmitted via the normal mounting screws.

19 Claims, 4 Drawing Sheets

DATA STORAGE DEVICE WITH SHOCK SENSOR MOUNTED ON CIRCUIT BOARD AND PROVIDED ADJACENT SHIELD AND DISC ASSEMBLY PROTRUSIONS

FIELD OF THE INVENTION

The present invention relates generally to shock sensors for disc drives. More particularly, the present invention relates to an apparatus and method for mounting shock sensors to the printed circuit board of a disc drive such that the placement of the shock sensors is not constrained.

BACKGROUND OF THE INVENTION

Data Storage devices such as disc drives are commonly used in workstations, personal computers, laptops and other computer systems to store large amounts of data in a form that can be made readily available to a user. In addition, disc drives are also making their way into a wide variety of consumer electronic devices such as MP3 players. In general, a disc drive comprises a magnetic disc that is rotated by a spindle motor. The surface of the disc is divided into a series of data tracks. The data tracks are spaced radially from one another across a band having an inner diameter and an outer diameter.

Each of the data tracks extends generally circumferentially around the disc and can store data in the form of magnetic transitions within the radial extent of the track on the disc surface. An interactive element, such as a magnetic transducer, is used to sense the magnetic transitions to read data, or to transmit an electric signal that causes a magnetic transition on the disc surface, to write data. The magnetic transducer is mounted by a head structure to a rotary actuator arm and is selectively positioned by the actuator arm over a preselected data track of the disc to either read data from or write data to the preselected data track of the disc, as the disc rotates below the transducer. The actuator arm is, in turn, mounted to a voice coil motor that can be controlled to move the actuator arm across the disc surface.

A servo control system is typically used to control the position of the actuator arm to insure that the head is properly centered over the magnetic transitions during either a read or write operation. In a known servo control system, servo position information is recorded on the disc surface between written data blocks, and periodically read by the head for use in a closed loop control of the voice coil motor to position the actuator arm. Such a servo arrangement is referred to as an embedded servo system and the recorded servo position information is referred to as a servo pattern. The servo pattern is typically written on the data tracks in discrete spokes radiating out from the center of the disc.

The data tracks of a disc in the disc drive cannot be allowed to interfere with one another. If interference occurs, i.e. the read/write heads move off-track, the data previously written to a track will be overwritten and the data will be corrupted. In order to avoid interference of the data tracks, the servo control system discussed above is utilized to maintain the position of the read/write heads over the center of the data track.

Under normal operating conditions, the servo control system performs well using the feedback provided by the servo pattern to predict the read/write head location at the next area of the servo pattern and to reject disturbances which the disc drive is subjected to. However, when the disc drive experiences a very large mechanical shock, the rate of change of position and/or velocity of the read/write head position exceeds the servo system's capability to predict the head location at the next area of the servo pattern. The disc drive uses the predicted position to terminate any write operations it is performing before any adjacent track data corruption occurs. When the large shock occurs, and the head movement exceeds the servo prediction capability, and write corruption can occur.

The present invention provides a solution to this and other problems, and offers other advantages over previous solutions.

SUMMARY OF THE INVENTION

The present invention provides an apparatus and method for mounting a shock sensor to the printed circuit board (PCB) of a disc drive. In particular, the present invention allows the shock sensor to be mounted at any location on the printed circuit board rather than being limited to placement adjacent a mounting screw.

The present invention includes a clamping mechanism for rigidly clamping the PCB to the head disc assembly (HDA) so that any shock is properly transmitted from the HDA to the PCB and then to the shock sensor. In one exemplary embodiment, the PCB is clamped between a top shield and the HDA. The shock sensor is then positioned near the point at which the PCB is clamped so that the point of clamping provides transmission of any shock in the Z-axis to the shock sensor. Shocks in the X-Y axis direction are transmitted via the normal mounting screws. The top shield is properly attached to the HDA by clips or screws.

In order to provide the clamping of the PCB, either the top shield, the HDA, or both, may be formed such that corresponding protrusions on either side of the PCB cause a clamping pressure to be applied to the PCB to thereby securely clamp the PCB. For example, the HDA may be bossed up from below or plastic molding can be formed to protrude from the HDA. Alternatively, rubber mounts can be molded up from the HDA. The top shield may then be dimpled in the area above the matching bossed up area, rubber mounts, or plastic molding, such that there is a firm compression connection between the HDA, PCB and shield to form a firm connection of the PCB to the HDA. These clamping structures are preferably positioned in an area adjacent to, or surrounding, the area occupied by the shock sensor.

The materials and shape of the HDA boss-up and shield dimple/boss-down may be chosen to either attenuate or amplify frequency components to make the shock output of the shock sensor more accurate with reference to the actual shock applied to the HDA.

The clamping function of the shield and the HDA boss frees the shock sensor mounting method from the constraint of being near a PCB mounting screw. The clamp according to the present invention may be placed anywhere on the PCB, so long as the features of the clamp are manufacturable in the selected location and the shield can provide enough downward force to properly clamp the PCB to the HDA. These and various other features as well as advantages which characterize the present invention will be apparent upon reading of the following detailed description and review of the associated drawings.

DETAILED DESCRIPTION

Figure 1:
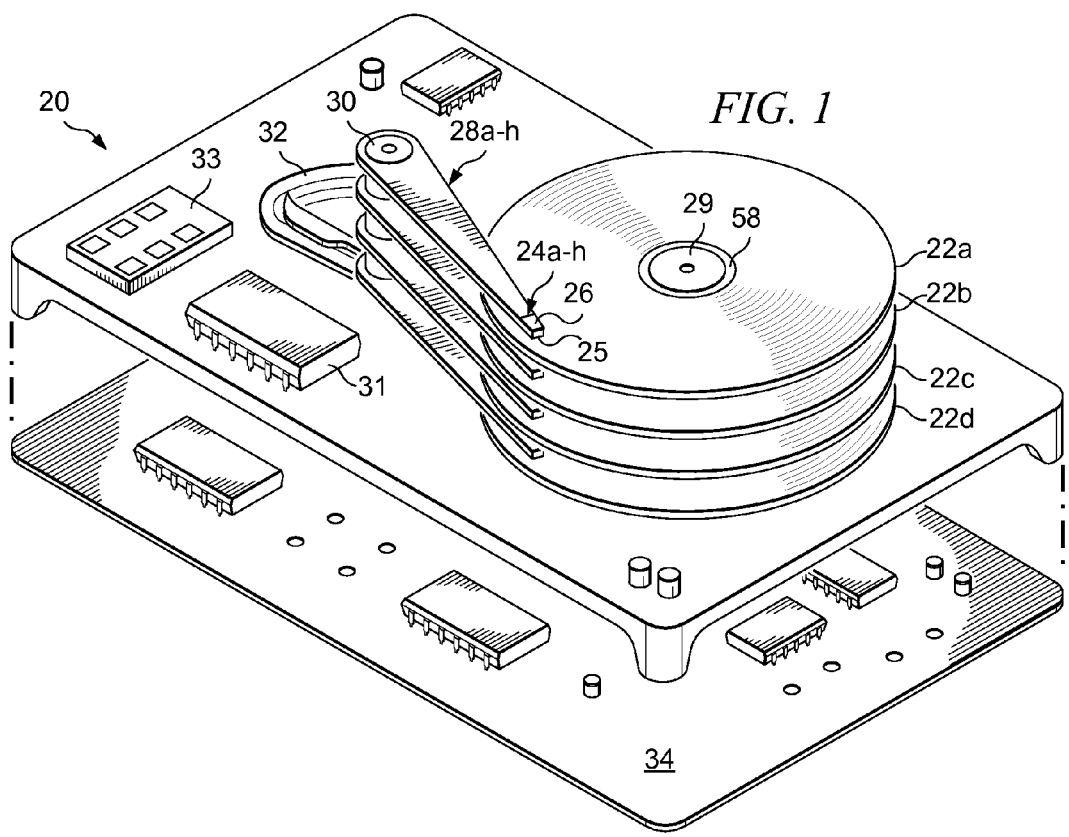
FIG. 1 is an exemplary perspective view of an exemplary disc drive.

As mentioned above, when a disc drive experiences a very large shock, the rate of change of position and/or velocity of the read/write head position exceeds the servo system's capability to predict the head location at the next servo sector sample and, as a result, write corruption can occur. This is because the disc drive uses the predicted position of the head location to terminate write operations before adjacent track data corruption occurs. The signal that is used to terminate the write operation is called a write unsafe signal.

The write unsafe signal can also be generated based on the occurrence of other events, e.g., head short circuits, head unstable conditions, the servo controller predicting an off-track condition is about to occur, or the output of a shock sensor circuit. A shock sensor circuit, associated with the disc drive, may generate an output that indicates a shock event is occurring and that this shock event will exceed the drive's prediction capability, which will cause adjacent track write corruption if a write is allowed to happen.

The shock sensor circuit method of predicting a shock occurrence to a read/write head works because of the following factors. The shock takes time to transmit from the outside of the disc drive (where the shock sensor is attached), into the casing of the disc drive, down the arm and disc mountings, and then finally to the head and disc interface. The arm and disc, being mechanical devices and having inertia, take some time to translate the shock to actual movement between the arm and disc, resulting in off-track motion. The shock sensor is able to represent the actual amount of shock experienced by the hard disc's internal mechanical components. The functionality of the shock sensor circuit assumes that the mounting of the shock sensor circuit is very rigid and well connected to the disc drive Head Disc Assembly (HDA) so that the shock being applied to the HDA will also be accurately transmitted to the shock sensor circuit.

Mounting of the shock sensor circuit to the printed circuit board (PCB) is limited by many issues. First, space is limited on the PCB, especially for smaller form factors such as 1 inch disc drives. In addition, the PCBs that the components are mounted on are usually very thin on a small form factor disc drive due to height constraints. The PCB will usually have as few screws as possible holding it to the HDA to reduce assembly complexity and cost. These few PCB mounting screws are usually sufficient to transmit the X and Y (in plane) axis shock to the PCB. However, the Z axis shock requires that the PCB area around the shock sensor be firmly connected to the HDA such that the Z axis shock is well transmitted to the sensor and the PCB does not flex too much.

The mounting conditions of the PCB to the HDA, with the limited number of screws, usually makes the transmission of shock (especially shock along the Z axis) to the PCB sub-optimal. It is necessary to mount the shock sensor circuit close to a PCB mounting screw to enable the shock to be better transmitted to the shock sensor circuit via the thin PCB. In addition, the PCB thinness makes transmission of the Z axis shock difficult without a mounting location very close to a PCB mounting screw, as the PCB tends to flex easily and distort/attenuate the shock transmitted to the shock sensor. These constraints make the mounting of the shock sensor circuit difficult, especially is small disc drives such as a 1 inch disc drive.

The present invention provides an apparatus and method for mounting shock sensors to the printed circuit board of a disc drive such that the placement of the shock sensors is not constrained. The present invention also provides a clamping mechanism that frees the shock sensor mounting method from the constraint of being near a PCB mounting screw. The clamping mechanism according to the present invention may be placed anywhere on the PCB.

Referring now to the drawings, and initially to FIG. 1, there is illustrated an example of a disc drive having a hard disc assembly designated generally by the reference numeral 20. The hard disc assembly 20 includes a stack of storage discs 22*a-d* and a stack of read/write heads 24*a-h*. In the depicted example, heads are only shown on the top surface of each platter of the disc driver for simplicity and clarity of the drawing, however, it should be noted that additional heads are typically provided for the bottom surfaces of each platter as well. Each of the storage discs 22*a-d* is provided with a plurality of data tracks to store user data. As illustrated in FIG. 1, one head is provided for each surface of each of the discs 22*a-d* such that data can be read from or written to the data tracks of all of the storage discs. The heads are coupled to a pre-amplifier 31. It should be understood that the depicted disc drive is merely representative of a disc drive system utilizing the present invention and that the present invention can be implemented in a disc drive system including more or less storage discs and heads.

The storage discs 22*a-d* are mounted for rotation by a spindle motor arrangement 29, as is known in the art. Moreover, the read/write heads 24*a-h* are supported by respective actuator arms 28*a-h* for controlled positioning over preselected radii of the storage discs 22*a-d* to enable the reading and writing of data from and to the data tracks. To that end, the actuator arms 28*a-h* are rotatably mounted on a pin 30 by a voice coil motor 32 operable to controllably rotate the actuator arms 28*a-h* radially across the disc surfaces.

Each of the read/write heads 24*a-h* is mounted to a respective actuator arm 28*a-h* by a flexure element (not shown) and comprises a magnetic transducer 25 mounted to a slider 26 having an air bearing surface (not shown), all in a known manner. As typically utilized in disc drive systems, the sliders 26 cause the magnetic transducers 25 of the read/write heads 24*a-h* to "fly" above the surfaces of the respective storage discs 22*a-d* for non-contact operation of the disc drive system, as discussed above. When not in use, the voice coil motor 32 may rotate the actuator arms 28*a-h*, to position the read/write heads 24*a-h* over a respective landing zone 58 or 60, where the read/write heads 24*a-h* will come to rest on the storage disc surfaces. Alternatively, the voice coil motor 32 may rotate the actuator arms 28*a-h* to travel up a ramp to park the heads off of the disc 22-*a-d* surface.

A printed circuit board (PCB) 34 is provided to mount control electronics for controlled operation of the spindle motor 29 and the voice coil motor 32. The PCB 34 also includes read/write channel circuitry coupled to the read/write heads 24*a-h* via the pre-amplifier 31, to control the transfer of data to and from the data tracks of the storage discs 22*a-d*. The manner for coupling the PCB 34 to the various components of the disc drive is well known in the art, and includes a connector 33 to couple the read/write channel circuitry to the pre-amplifier 31.

Figure 2:
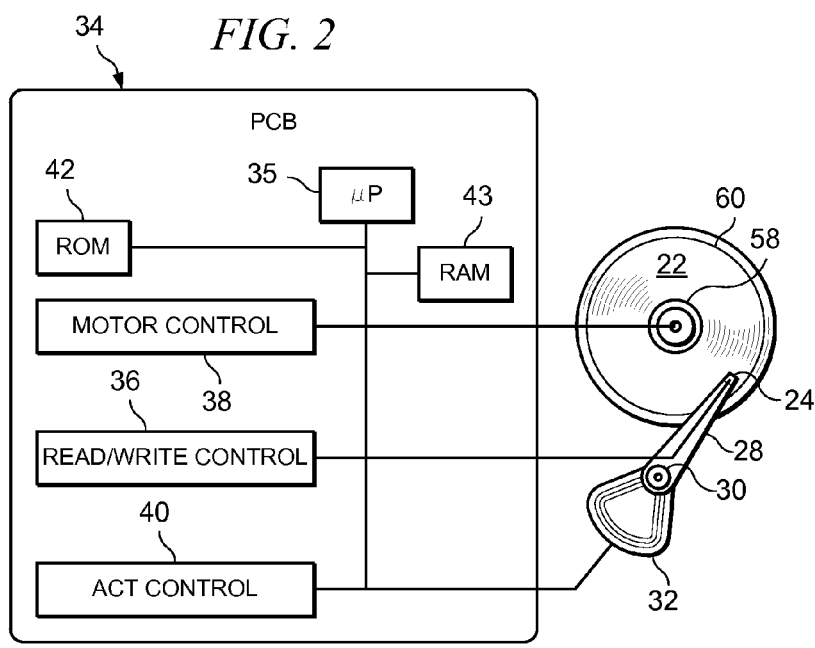
FIG. 2 is an exemplary top plan view of the printed circuit board of the exemplary disc drive of FIG. 1.

Referring now to FIG. 2, there is illustrated in schematic form the PCB 34 and the electrical couplings between the control electronics on the PCB 34 and the components of the disc drive system described above. A microprocessor 35 is coupled to each of a read/write control 36, spindle motor control 38, actuator control 40, ROM 42 and RAM 43. In modern disc drive designs, the microprocessor can comprise a digital signal processor (DSP). The microprocessor 35 sends data to and receives data from the storage discs 22a-d via the read/write control 36 and the read/write heads 24a-h.

When data to be written or read from one of the storage discs 22a-d are stored on a data track different from the current radial position of the read/write heads 24a-h, the microprocessor 35 determines the current radial position of the read/write heads 24a-h and the radial position of the data track where the read/write heads 24a-h are to be relocated. The microprocessor 35 then implements a seek operation wherein the control signals generated by the microprocessor 35 for the actuator control 40 cause the voice coil motor 32 to move the read/write heads 24a-h from the current data track to a destination data track at the desired radial position.

Figure 3:
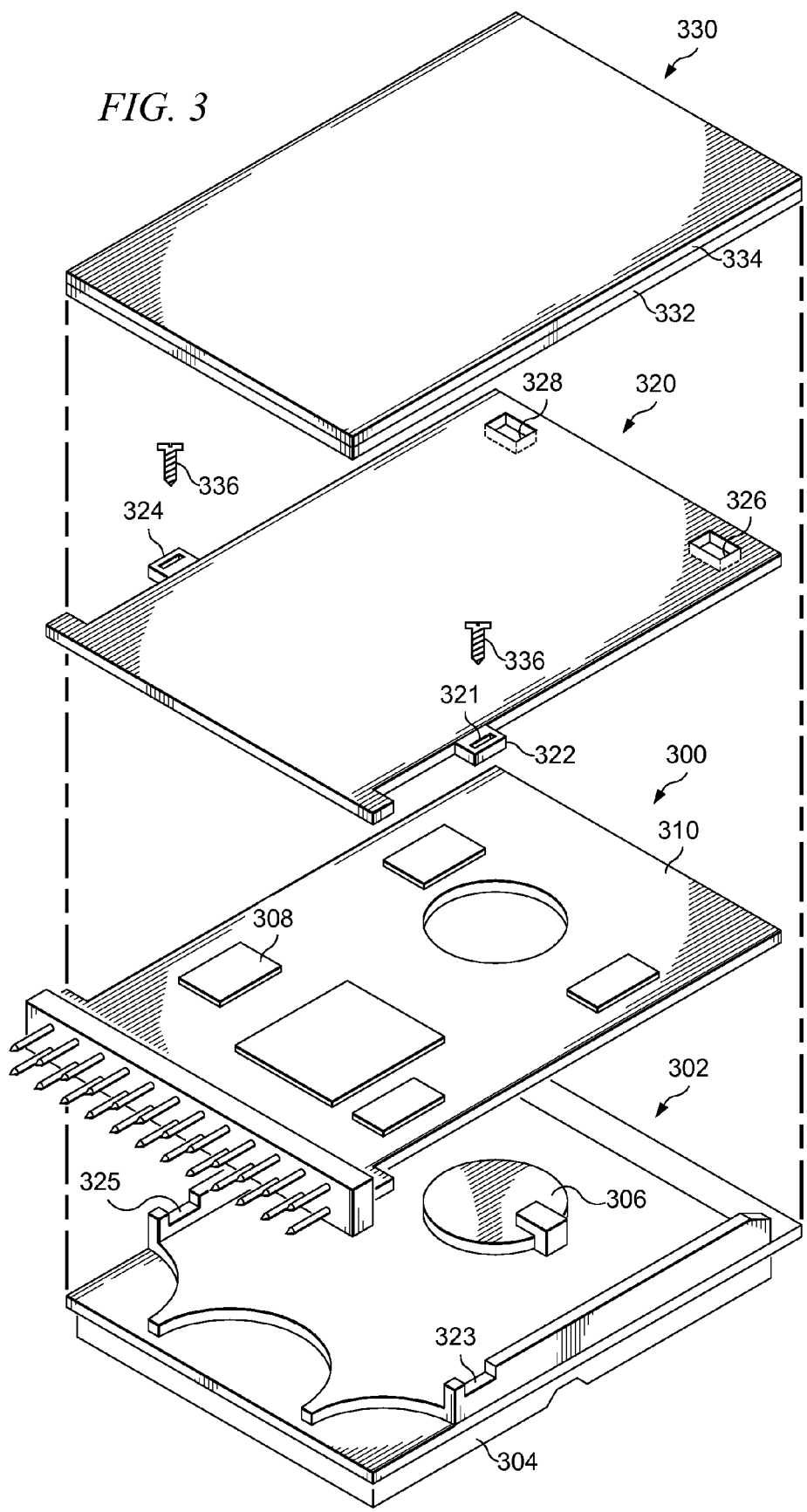
FIG. 3 is a perspective exploded view of the major components on the disc drive assembly.

FIG. 3 is a perspective exploded view of the major components on the disc drive assembly. A head disc assembly cover 304 is shown attached to a disc drive base 302, which is the part of the HDA 20 in FIG. 1 upon which the other components of the HDA 20 are mounted. The bottom surface of the spindle motor 306 extends through the disc drive base 302. A printed circuit board assembly (PCBA) 300 mounts to the bottom surface of the disc drive base 302.

A protective cover 320, or shield, is fastened to the disc drive base 302 and extends over the PCBA 300 protecting it from handling and electrostatic damage. The protective cover 320 is generally a flat plate shaped body and is attached to the disc drive base 302 using attachment members 322 and 324, respectively. The attachment members 322 and 324 rest within a pair of attachment guide slots 323 and 325 on the side rails of the disc drive base 302. Each of the attachment members 322 and 324 has an aperture 321 that is capable of receiving a fastening member such as a screw 336 that secures the protective cover 320 to the to the disc drive base 302. The protective cover 320 is also secured directly to the PCBA 300 using the retaining members 326 arid 328. The retaining members 326 and 328 engage the rear edge portion 310 of the PCBA 300 to further stabilize the protective cover 320 on the disc drive assembly 300.

As shown in FIG. 3, a constrain layer 330 is affixed to the upper surface of the protective cover 320. The constrain layer 330 is made up of a stiffening member 334 and a damping member 332 that are sandwiched together. The stiffening member 334 is preferably made from a sheet material having a high mechanical stiffness. For example, the stiffening member 334 can be made of a metal such as steel or a similar material having a high modulus of elasticity. The damping member 332 is preferably made from a material having good damping properties. For example, the damping member 332 may include or may be a pressure sensitive adhesive layer enabling the constrain layer 330 to be affixed directly to the surface of the protective cover 320.

It should be appreciated that FIG. 3 is only an exemplary diagram of the major components of an exemplary disc drive assembly in which aspects of the present invention may be implemented. Many modifications may be made to the depicted exemplary disc drive assembly without departing from the spirit and scope of the present invention.

For example, in some alternative disc drive assemblies, the protective cover 320 and stiffening member 334 may not be present as separate layers. To the contrary, a single protective/constraint layer, also referred to as a shield, may be provided as a top layer in the disc drive assembly. Below this protective/constraint layer a damping layer, such as damping member 332, may or may not be provided. In many cases, the damping layer may act as an insulating layer between the protective/constraint layer and the PCB 300. Alternatively, an insulating layer may be provided that acts as a damping layer. Moreover, a damping/insulating layer may be provided between the PCB 300 and the HDA 302. Other modifications may also be made to the depicted exemplary disc drive assembly without departing from the spirit and scope of the present invention.

Traditional mounting methods for mounting the PCB 300 to the hard disc assembly (HDA) 20, i.e. the disc drive base 302, involve using mounting screws to securely fasten the PCB 300 to the HDA base 302. Because it is necessary in such systems to use the mounting screws as a mechanism for transmitting the shock force in a Z-axis direction (where the X-axis and Y-axis are in the plane of the PCB 300 and the Z-axis is perpendicular to the plane of the PCB 300), and because the PCB 300 tends to have flexibility due to its thinness, it is necessary to mount the shock sensor for measuring the shock force adjacent one of the mounting screws. This greatly limits the possible locations for mounting the shock sensor. This is especially true for small disc drive systems, such as a 1 inch disc drive.

The present invention provides a solution to the problem of placement of the shock sensor 308 on the PCB 300 by providing a clamping mechanism for creating a clamping point on the PCB 300 at which there is a firm compression connection between the HDA base 302, the PCB 300 and the protective cover or shield 320. Because this clamping point provides a firm connection, shock forces imparted to the HDA base 302 may be accurately measured by a shock sensor 308 positioned within a close proximity to the clamping point. That is, if the shock sensor 308 is positioned in an area adjacent to a clamping point created using the present invention, then the shock sensor 308 will provide similar measurements of shock forces as if it were mounted at a mounting screw position. However, since the clamping point may be created anywhere on the PCB 300 so long as the clamping features are manufacturable in the selected location, there is greater flexibility in positioning the shock sensor 308 on the PCB 300.

Figure 4:
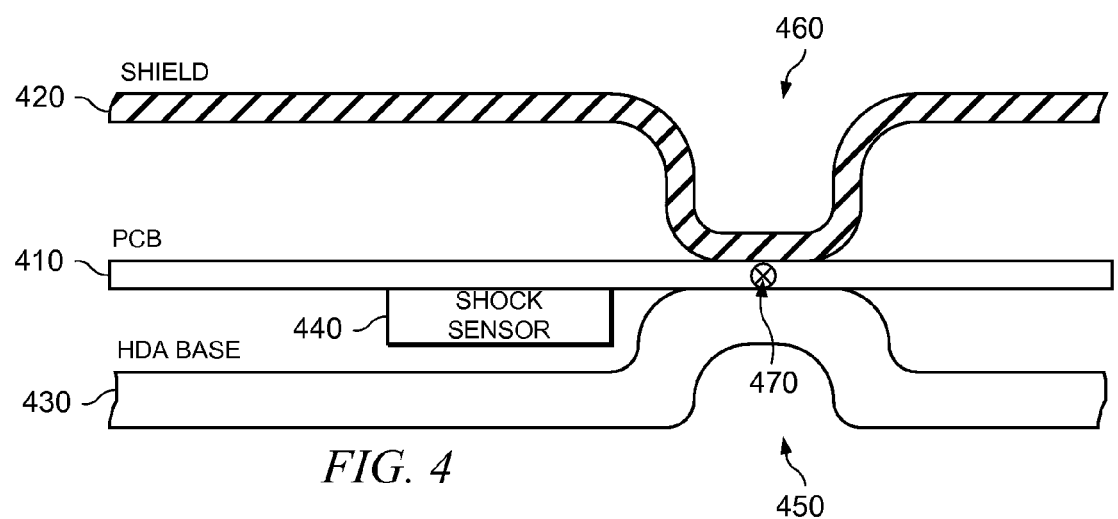
FIG. 4 is an exemplary diagram of one exemplary embodiment of a clamping structure in accordance with the present invention.

FIG. 4 is an exemplary diagram of a clamping mechanism in accordance with an exemplary embodiment of the present invention. As shown in FIG. 4, in one exemplary embodiment, the PCB 410 is clamped between a shield 420 and the HDA base 430. The shock sensor 440 is then position near the point at which the PCB 410 is clamped so that the point of clamping 470 provides transmission of any shock in the Z-axis to the shock sensor 440. Shocks in the X-Y axis direction are transmitted via the normal mounting screws. The shield 420 is preferably attached to the HDA base 430 by clips, screws, or by any other suitable fastener.

In order to provide the clamping of the PCB 410, either the shield 420, the HDA base 430, or both, may be formed such that corresponding protrusions on either side of the PCB 410 cause a clamping pressure to be applied to the PCB 410 to thereby securely clamp the PCB 410. For example, the HDA base 430 may be bossed up from below or plastic molding can be formed so as to create a protrusion 450 from the HDA base 430. Alternatively, rubber mounts can be molded up from the HDA base 430 to create a protrusion 450. The shield 420 may then be dimpled in the area above the matching bossed up area, rubber mounts, or plastic molding, to thereby create a protrusion 460 of the shield 420. The interaction of the shield protrusion 460 and the HDA base protrusion 450 creates a firm compression connection between the HDA base 430, the PCB 410 and the shield 420 to form a firm connection of the PCB 410 to the HDA base 430. These clamping structures are preferably positioned in an area adjacent to, or surrounding, the area occupied by the shock sensor 440.

The materials and shape of the HDA base boss-up 450 and shield dimple/boss-down 460 may be chosen to either attenuate or amplify frequency components to make the shock output of the shock sensor 440 more accurate with reference to the actual shock applied to the HDA.

The clamping function of the shield and the HDA protrusions 450-460 frees the shock sensor 440 mounting method from the constraint of being near a PCB mounting screw. The clamp according to the present invention may be placed anywhere on the PCB 410, so long as the features of the clamp are manufacturable in the selected location and the shield 420 can provide enough downward force to properly clamp the PCB 410 to the HDA base 430.

By placing the shock sensor 440 in close proximity to the clamp structure of the present invention, allows the shock sensor 440 to measure the Z-axis shock forces with the same accuracy as is obtained from conventional shock sensor mountings in which the location of the shock sensor is restricted to being adjacent the mounting screws. Furthermore, Z-axis shock testing of transmitted shock to the shock sensor 440 show significant improvements as compared to a shock sensor on a similar PCB which is not properly clamped or with a shock sensor not mounted close to a mounting screw.

Figure 5:
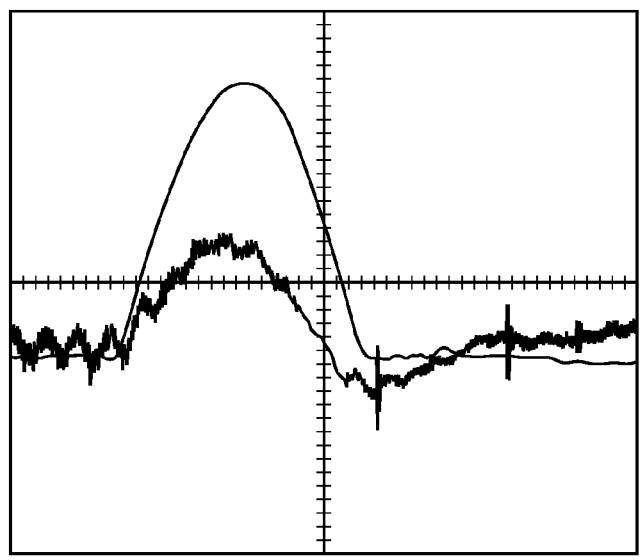
FIG. 5 shows the Z-axis transmission to a shock sensor which is not properly mounted near a mounting screw and not properly clamped to the HDA base.

FIG. 5 shows the Z-axis transmission to a shock sensor which is not properly mounted near a mounting screw and not properly clamped to the HDA base. The larger trace is the reference shock input as measured from an external accelerometer. The smaller trace is the shock sensor output. The input pulse is 40 G in amplitude. As shown in FIG. 5, the shock sensor output shows significant distortion from other frequency components induced by the PCB vibration.

Figure 6:
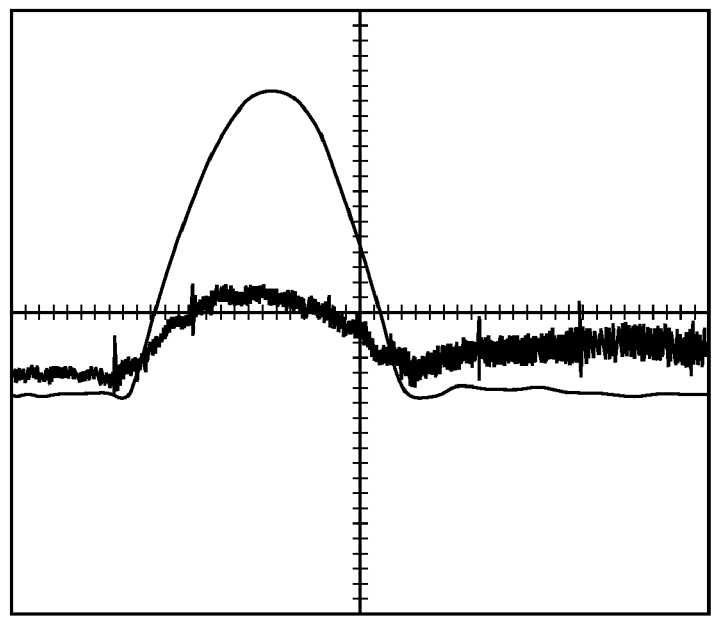
FIG. 6 shows the Z-axis shock transmission to a shock sensor which is mounted near an HDA/shield clamp in accordance with the present invention.
Figure 7:
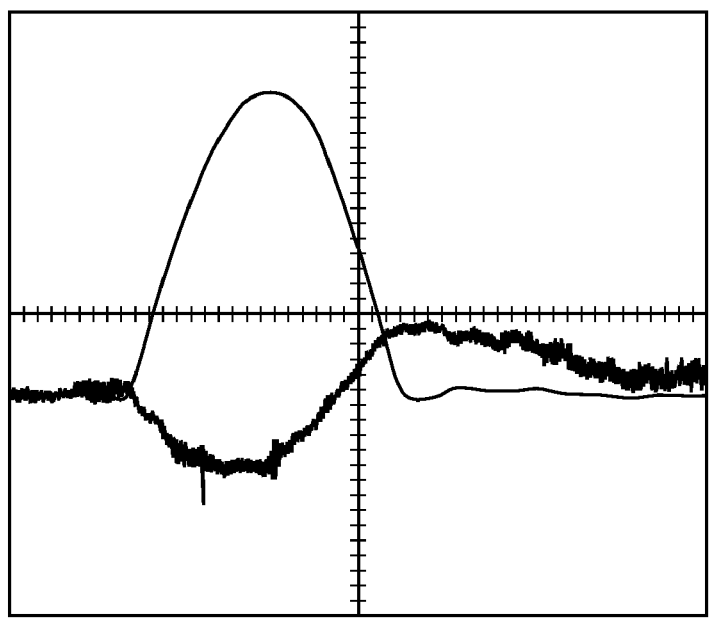
FIG. 7 shows the Z-axis shock transmission to a shock sensor which is mounted near a PCB mounting screw.

FIG. 6 shows the Z-axis shock transmission to a shock sensor which is mounted near an HDA/shield clamp in accordance with the present invention. As is shown in FIG. 6, the distortion introduced by the PCB vibration is no longer present. FIG. 7 shows the Z-axis shock transmission to a shock sensor which is mounted near a PCB mounting screw. As shown, the output of the shock sensor is similar to the output of the shock sensor mounted near the HDA/Shield clamp in accordance with the present invention.

These results indicate that the HDA/Shield clamp performs well in transmitting the Z-axis shock to the shock sensor and avoids the distortion induced by the PCB vibrations when the board is not properly constrained in the Z-axis. X and Y axis shock results are comparable for all three mounting conditions. Thus, the PCB around the shock sensor can be properly constrained to accurately transmit shock to the shock sensor in the X, Y and Z directions without adding any additional components or restricting the location of the shock sensor to areas adjacent the mounting screws.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data storage device, comprising:
   a shield having a first protrusion formed thereon;
   a hard disc assembly having a second protrusion formed thereon; and
   a printed circuit board, wherein the first protrusion and second protrusion generate a compression connection between the hard disc assembly, the printed circuit board, and the shield such that a firm connection of the printed circuit board to the hard disc assembly is created; and
   a shock sensor mounted on the printed circuit board in close proximity to the first protrusion and the second protrusion.

2. The data storage device of claim 1, wherein the first protrusion is one of a dimple formed in the shield, a bossed-down portion of the shield, and a rubber mount.

3. The data storage device of claim 1, wherein the second protrusion is one of a bossed up area of the hard disc assembly, a rubber mount, and a plastic molding formed to protrude from the hard disc assembly.

4. The data storage device of claim 1, wherein the shock sensor is mounted at a location such that shock forces in a first direction, are transmitted to the shock sensor via the first and second protrusions.

5. The data storage device of claim 4, further comprising:
   one or more mounting screws, wherein the shock sensor is located remotely from the one or more mounting screws and wherein a shock force in a second direction is transmitted to the shock sensor via the one or more mounting screws.

6. The data storage device of claim 1, further comprising:
   one or more mounting screws for securing the printed circuit board to the hard disc assembly, wherein the first protrusion and the second protrusion together form a clamping point on the printed circuit board, and wherein placement of the clamping point is not limited to any one portion of the printed circuit board.

7. The data storage device of claim 6, wherein the clamping point is remotely located from the one or more mounting screws.

8. The data storage device of claim 1, wherein a constrain layer is affixed to a surface of the shield.

9. The data storage device of claim 8, wherein the constrain layer comprises a stiffening member and damping member.

10. The data storage device of claim 1, wherein the first protrusion and the second protrusion surround the shock sensor.

11. A data storage device comprising:
    a shield having a first protrusion formed thereon;
    a hard disc assembly having a second protrusion formed thereon; and
    a printed circuit board, wherein the first protrusion and second protrusion generate a compression connection between the hard disc assembly, the printed circuit board, and the shield such that a firm connection of the printed circuit board, to the hard disc assembly is created;
    a shock sensor mounted on the printed circuit board; and
    one or more mounting screws that attach the shield to the hard disc assembly, wherein the shock sensor is located remotely from the one or more mounting screws so that shock forces are transmittable to the shock sensor via at least one of the first and second protrusions.

12. The data storage device of claim 11, wherein the first protrusion is one of a dimple formed in the shield, a bosseddown portion of the shield, and a rubber mount.

13. The data storage device of claim 11, wherein the second protrusion is one of a bossed up area of the hard disc assembly, a rubber mount, and a plastic molding formed to protrude from the hard disc assembly.

14. The data storage device of claim 11, wherein the shock sensor is mounted at a location such that shock forces in a first direction are transmitted to the shock sensor via the first and second protrusions.

15. The data storage device of claim 11, wherein a shock force in a second direction is transmitted to the shock sensor via the one or more mounting screws.

16. The data storage device of claim 11, wherein the first protrusion and the second protrusion together form a clamping point on the printed circuit board, and wherein the clamping point is remotely located from the one or more mounting screws.

17. The data storage device of claim 11, wherein a constrain layer is affixed to a surface of the shield.

18. The data storage device of claim 17, wherein the constrain layer comprises a stiffening member and damping member.

19. The data storage device of claim 11, wherein the first protrusion and the second protrusion surround the shock sensor.

* * * * *